US009768893B1

(12) United States Patent
Wank et al.

(10) Patent No.: US 9,768,893 B1
(45) Date of Patent: Sep. 19, 2017

(54) OVER-THE-AIR ISOLATION TESTING

(71) Applicant: Spirent Communications, Inc., Sunnyvale, CA (US)

(72) Inventors: Richard Wank, Plano, TX (US); Mike Ludwig, Plano, TX (US); Kevin Canady, Plano, TX (US); Michael Shen, Plano, TX (US)

(73) Assignee: Spirent Communications, Inc., Sunnyvale, CA (US)

( * ) Notice: Subject to any disclaimer, the term of this patent is extended or adjusted under 35 U.S.C. 154(b) by 0 days.

(21) Appl. No.: 15/353,697

(22) Filed: Nov. 16, 2016

(51) Int. Cl.
*H04B 17/16* (2015.01)
*H04B 17/00* (2015.01)
*H04W 24/06* (2009.01)

(52) U.S. Cl.
CPC ......... *H04B 17/16* (2015.01); *H04B 17/0085* (2013.01); *H04W 24/06* (2013.01)

(58) Field of Classification Search
CPC .... H04B 17/16; H04B 17/0085; H04W 24/06
USPC ............. 455/67.14; 370/241.1, 338; 702/117
See application file for complete search history.

(56) References Cited

U.S. PATENT DOCUMENTS

| | | | | |
|---|---|---|---|---|
| 5,794,128 A * | 8/1998 | Brockel | ............. | H04B 17/3912 455/506 |
| 6,278,485 B1 * | 8/2001 | Franchville | .......... | H04B 17/309 324/76.19 |
| 6,345,239 B1 * | 2/2002 | Bowman-Amuah | .. | G06Q 20/10 703/6 |
| 6,427,132 B1 * | 7/2002 | Bowman-Amuah | .. | G06Q 30/02 703/22 |
| 6,430,410 B1 * | 8/2002 | Staber | ................... | H04W 24/00 455/423 |
| 6,611,867 B1 * | 8/2003 | Bowman-Amuah | | H04L 12/2602 709/218 |
| 6,631,339 B2 * | 10/2003 | Poulsen | ............. | H04B 17/0085 375/224 |

(Continued)

OTHER PUBLICATIONS

Aries White Paper, "2G, 3G, 4G . . . OMG! What G is the Right for IoT/M2m?," Aeries Communications, Inc., Copyright 2016, 12 pages.

(Continued)

*Primary Examiner* — Hai V Nguyen
(74) *Attorney, Agent, or Firm* — Deborah L. Caswell; Haynes Beffel & Wolfeld LLP

(57) ABSTRACT

A unique method/device for isolating the over-the-air segment within a mobile communications network is provided. A coordinated set of tests is run to isolate problems in an end-to-end network including over-the-air segment, wired, and core network segments. Test results are compared to identify which segment or components within a segment is failing. The testing device executes the same test in two differentiated modes. In one mode, the device acts as a mobile client device identified by subscriber identification data that communicates with the network base station over-the-air using the standard control and data protocols of the mobile network. In another mode, the testing device, identified by the same subscriber identification data, acts like the combination of the same Mobile Client Device(s) and a Network Base Station using a wired interface that is equivalent to the wired interface that connects the network base station to the rest of the wired network.

18 Claims, 10 Drawing Sheets

(56) References Cited

U.S. PATENT DOCUMENTS

| | | | |
|---|---|---|---|
| 6,671,818 B1* | 12/2003 | Mikurak | G06Q 10/06 714/4.21 |
| 6,724,730 B1* | 4/2004 | Mlinarsky | H04L 12/2697 370/241 |
| 6,901,530 B2* | 5/2005 | Cerami | G06Q 10/087 714/4.3 |
| 6,922,395 B1* | 7/2005 | Elliott | H04L 12/2602 370/241 |
| 6,978,302 B1* | 12/2005 | Chisholm | H04L 41/0213 370/242 |
| 6,981,039 B2* | 12/2005 | Cerami | G06Q 10/087 370/216 |
| 7,075,893 B1* | 7/2006 | Mlinarsky | H04L 12/2697 370/241 |
| 7,085,238 B2* | 8/2006 | McBeath | H04L 12/46 370/249 |
| 7,096,012 B2* | 8/2006 | El Husseini | H04W 24/00 370/241.1 |
| 7,134,135 B2* | 11/2006 | Cerami | G06Q 10/087 707/999.001 |
| 7,184,866 B2* | 2/2007 | Squires | A62C 27/00 340/426.15 |
| 7,277,700 B2* | 10/2007 | El Husseini | H04W 24/00 370/241.1 |
| 7,434,099 B2* | 10/2008 | Flynn | H04L 12/66 714/26 |
| 7,441,154 B2* | 10/2008 | Klotz | G06F 11/2257 714/39 |
| 7,450,908 B1* | 11/2008 | Bilder | H04L 12/2697 370/229 |
| 7,620,368 B2* | 11/2009 | Wang | H04B 17/0085 455/226.1 |
| 7,620,989 B1* | 11/2009 | Couturier | H04L 12/2697 726/22 |
| 7,698,121 B2* | 4/2010 | Steenkiste | H04W 16/22 370/241 |
| 7,801,158 B2* | 9/2010 | Voit | H04L 41/0253 370/230 |
| 7,828,212 B2* | 11/2010 | Gallagher | G06K 7/0013 235/441 |
| 7,831,249 B2* | 11/2010 | Lohlein | H04M 1/24 455/423 |
| 7,835,293 B2* | 11/2010 | Cidon | H04L 12/2697 370/248 |
| 7,860,461 B1* | 12/2010 | Bilder | H04L 12/2697 370/229 |
| 7,899,642 B2* | 3/2011 | Rowse | H04L 1/243 702/122 |
| 7,908,632 B2* | 3/2011 | Russell | H04N 17/00 725/107 |
| 7,961,629 B2* | 6/2011 | Ueda | H04B 1/62 370/241 |
| 8,004,962 B2* | 8/2011 | Yang | H04H 20/12 370/216 |
| 8,040,811 B2* | 10/2011 | Edwards | H04L 41/22 370/241 |
| 8,223,655 B2* | 7/2012 | Heinz | H04L 41/0806 370/236 |
| 8,363,643 B2* | 1/2013 | Kim | H04L 12/66 370/352 |
| 8,412,180 B2* | 4/2013 | Huber | H04B 17/0085 455/423 |
| 8,504,319 B2* | 8/2013 | Qian | H04L 43/50 370/241 |
| 8,520,532 B2* | 8/2013 | Russell | H04N 17/00 370/242 |
| 8,576,722 B2* | 11/2013 | Bugenhagen | H04L 43/026 370/216 |
| 8,619,600 B2* | 12/2013 | Morrill | H04L 65/80 370/241 |
| 8,627,150 B2* | 1/2014 | Sambamurthy | G06F 11/079 714/47.3 |
| 8,631,499 B2* | 1/2014 | Guruswamy | G06F 21/577 709/224 |
| 8,670,115 B2* | 3/2014 | Miyoshi | G01N 21/9501 356/237.1 |
| 8,761,030 B2* | 6/2014 | Russell | H04N 17/00 370/242 |
| 8,761,350 B2* | 6/2014 | Faulkner | H04L 43/50 379/1.04 |
| 8,824,328 B2* | 9/2014 | Dhanapal | H04L 41/083 370/252 |
| 8,885,487 B2* | 11/2014 | Voit | H04L 41/0253 370/248 |
| 8,976,679 B2* | 3/2015 | Timus | H04W 24/02 370/241 |
| 8,996,917 B1* | 3/2015 | Chandramohan | G06F 11/3696 714/26 |
| 9,001,685 B1* | 4/2015 | Lushear | H04L 41/5038 370/252 |
| 9,042,245 B2* | 5/2015 | Tzannes | H04L 41/12 370/252 |
| 9,059,794 B2* | 6/2015 | Diez | H04B 17/0085 |
| 9,066,067 B2* | 6/2015 | Russell | H04N 17/00 |
| 9,252,982 B2* | 2/2016 | Jobe | H04L 12/66 |
| 9,253,661 B2* | 2/2016 | Bugenhagen | H04L 43/026 |
| 9,479,341 B2* | 10/2016 | Bugenhagen | H04L 12/14 |
| 9,519,063 B2* | 12/2016 | Davis | G01S 19/23 |
| 9,544,207 B2* | 1/2017 | Allen | H04L 41/0645 |
| 9,553,780 B1* | 1/2017 | Bullukian | H04L 41/5025 |
| 9,645,910 B1* | 5/2017 | Kaila | G06F 11/3624 |
| 2002/0053046 A1* | 5/2002 | Gray | G06F 11/008 714/42 |
| 2004/0003070 A1* | 1/2004 | Fernald | H04L 12/2602 709/223 |
| 2004/0024502 A1* | 2/2004 | Squires | A62C 27/00 701/29.3 |
| 2004/0088171 A1* | 5/2004 | Swam | H04Q 1/14 379/15.01 |
| 2004/0205456 A1* | 10/2004 | Hammock | G06F 17/211 715/277 |
| 2005/0053008 A1* | 3/2005 | Griesing | H04W 24/06 370/241 |
| 2005/0114838 A1* | 5/2005 | Stobie | G06F 11/3672 717/124 |
| 2005/0169185 A1* | 8/2005 | Qiu | H04L 41/145 370/241 |
| 2006/0039538 A1* | 2/2006 | Minnis | H04B 17/3912 379/1.01 |
| 2006/0098670 A1* | 5/2006 | Voit | H04L 41/0253 370/401 |
| 2006/0209866 A1* | 9/2006 | Steenkiste | H04W 16/22 370/419 |
| 2006/0226847 A1* | 10/2006 | Fure | G01R 31/31718 324/500 |
| 2006/0242522 A1* | 10/2006 | Schultz | G01R 31/2831 714/736 |
| 2007/0014341 A1* | 1/2007 | Rowse | H04L 1/243 375/224 |
| 2007/0076605 A1* | 4/2007 | Cidon | H04L 12/2697 370/230 |
| 2007/0147844 A1* | 6/2007 | Harres | H04B 10/504 398/135 |
| 2007/0168970 A1* | 7/2007 | Li | G06F 9/5038 717/124 |
| 2007/0254631 A1* | 11/2007 | Spooner | G06F 21/6218 455/411 |
| 2008/0049628 A1* | 2/2008 | Bugenhagen | H04W 24/02 370/244 |
| 2008/0052394 A1* | 2/2008 | Bugenhagen | H04L 12/14 709/224 |
| 2009/0075646 A1* | 3/2009 | Lohlein | H04M 1/24 455/423 |
| 2009/0121020 A1* | 5/2009 | Gallagher | G06K 7/0013 235/438 |
| 2009/0181665 A1* | 7/2009 | Sater | H04L 67/36 455/424 |

(56) References Cited

U.S. PATENT DOCUMENTS

| | | | | |
|---|---|---|---|---|
| 2009/0287816 A1* | 11/2009 | Matta | .................. | H04L 12/2697 709/224 |
| 2009/0316690 A1* | 12/2009 | Kim | ........................ | H04L 12/66 370/352 |
| 2010/0061378 A1* | 3/2010 | Joyner | ................ | H04L 12/4633 370/395.53 |
| 2010/0088278 A1* | 4/2010 | Wood | .................... | G06F 11/263 707/638 |
| 2010/0100772 A1* | 4/2010 | Troan | .................. | G06F 11/3688 714/38.1 |
| 2010/0120416 A1* | 5/2010 | Huber | ................ | H04B 17/0085 455/425 |
| 2011/0001833 A1* | 1/2011 | Grinkemeyer | ......... | H04H 20/12 348/192 |
| 2011/0069619 A1* | 3/2011 | Voit | .................... | H04L 41/0253 370/248 |
| 2011/0255080 A1* | 10/2011 | Miyoshi | ............. | G01N 21/9501 356/237.1 |
| 2011/0314145 A1* | 12/2011 | Raleigh | ............... | H04L 41/0893 709/224 |
| 2012/0039187 A1* | 2/2012 | Yang | ........................ | H04B 3/46 370/249 |
| 2012/0078565 A1* | 3/2012 | Qian | ........................ | H04L 43/50 702/117 |
| 2012/0185736 A1* | 7/2012 | Sambamurthy | ........ | G06F 11/079 714/47.3 |
| 2012/0300649 A1* | 11/2012 | Parmar | ............... | H04L 43/0888 370/252 |
| 2012/0307982 A1* | 12/2012 | Faulkner | ............... | H04M 3/305 379/27.01 |
| 2012/0307983 A1* | 12/2012 | Faulkner | .................. | H04B 3/46 379/29.03 |
| 2013/0070612 A1* | 3/2013 | Timus | .................... | H04W 24/02 370/241.1 |
| 2013/0202020 A1* | 8/2013 | Diez | .................. | H04B 17/0085 375/227 |
| 2013/0208589 A1* | 8/2013 | Lopez Toledo | ..... | H04W 72/087 370/230 |
| 2014/0043999 A1* | 2/2014 | Bugenhagen | ......... | H04W 24/02 370/252 |
| 2014/0253372 A1* | 9/2014 | Davis | ...................... | G01S 19/23 342/357.42 |
| 2015/0220426 A1* | 8/2015 | Spektor | ................... | G06F 11/36 717/131 |
| 2015/0242294 A1* | 8/2015 | Lapierre | ............. | G06F 11/2294 714/37 |
| 2015/0248344 A1* | 9/2015 | Farinacci | ............ | G06F 11/3692 714/38.1 |
| 2016/0041894 A1* | 2/2016 | Reid, III | ............. | G06F 11/3636 714/45 |
| 2016/0165226 A1* | 6/2016 | Djurdjevic | ................ | G06T 7/80 348/188 |
| 2016/0191673 A1* | 6/2016 | Bohannon | ........... | H04L 67/2861 709/213 |
| 2016/0198152 A1* | 7/2016 | Chin | ........................ | G06F 11/30 725/107 |
| 2016/0255513 A1* | 9/2016 | Lihosit | ................... | H04W 24/02 455/419 |
| 2016/0373588 A1* | 12/2016 | Raleigh | .................. | H04M 15/61 |
| 2016/0380878 A1* | 12/2016 | Bugenhagen | .......... | H04L 12/14 370/238 |
| 2017/0034506 A1* | 2/2017 | Dailey | .................. | H04N 17/004 |
| 2017/0068608 A1* | 3/2017 | Covell | ................. | G06F 11/3409 |
| 2017/0082687 A1* | 3/2017 | Klinger | ................... | G06F 11/36 |

OTHER PUBLICATIONS

Spirent White Paper, "Landslide in the Operational Network: Active Testing," Spirent Communications, Inc., Published Nov. 11, 2015, 5 pages.

ETSI, "Smart Cards; UICC-Terminal interface; Physical and logical characteristics (Relase 10)," Technical Specification, ETSI TS 102 221 V10.0.0, European Telecommunications Standards Institute, Copyright 2011, 179 pages.

Spirent Landslide Virtual, "Functional and performance testing Mobile, Wi-Fi, IMS and Diameter Networks," Spirent communications, Inc., Copyright Apr. 2016, 2 pages.

\* cited by examiner

OVER-THE-AIR ISOLATION TESTING

BACKGROUND

A mobile communications network is defined as any communications network that has over-the-air data/voice transmissions between a mobile client device (i.e. a handset, computer, mobile router, etc.) and a network base station (i.e. Access point, cell site, etc.). Common commercial examples include Wi-Fi networks, and 2G, 3G, 4G (LTE) and upcoming 5G cellular networks. In such networks the endpoint of the network, the network base station, provides the entry point into the network. It converts the over-the-air communications with the mobile client device into wired communications back into the network using technologies such as Ethernet and IP.

When subscribers complain of poor service, it may be difficult to isolate the cause of the problem in such a complex network. Although service providers have developed strategies for diagnosing problems in the backhaul and core networks, their tests cannot determine that the cause of a network performance problem is in the over-the-air portion of the network. Test handsets have been developed that can simulate traffic over-the-air, but the traffic is end-to-end, requiring response from the core network. The tests performed by the test handsets do not have the ability to isolate a problem within the over-the-air portion of the network.

SUMMARY

A unique method/device is provided for identifying that a problem exists in the over-the-air segment within any mobile communications network. For the purposes of this description, there are three relevant segments of the mobile communications network: the over-the-air network between the mobile client devices and the base station, the backhaul network between the base station and the core network, and within the core network between the backhaul network and the Internet or IP Multimedia Subsystem (IMS). The wired network interconnects the network base stations to each other and to non-mobile networks.

To isolate problems in a complex end-to-end network, a coordinated set of tests is run. The test results of the coordinated tests are compared to one another to identify the portion of the network experiencing a problem. The testing device isolates problems to a portion of the end-to-end network by executing similar versions of end-to-end type tests in two differentiated, yet interrelated, modes. In the first mode, the device acts as a mobile client device in the network. The testing device communicates to the network base station using the over-the-air segment of the network and executes a series of tests to communicate with other mobile devices or land devices connected through the mobile network. In this first mode, the testing device is essentially a mobile client device(s) from the perspective of the mobile communications network. The results of these tests contain the over-the-air segment of the end-to-end test, but it is not possible to separate out the contribution of the over-the-air segment on the test results.

In the second mode, the testing device emulates a base station as though the same test data from the same mobile device used in the first mode were received over the air. In the second mode, the testing device uses the wired interface to place traffic into the wired portion of the communications network, thus bypassing the network base station. In this second mode, the testing device acts as both a mobile client device and a network base station in tandem. When the testing device is activated in this mode, the rest of the network sees a new network base station with Mobile Client Devices connected to it. The testing device then executes a similar series of test in this second mode as was executed in the first mode.

Because there is no over-the-air segment to this second mode, as the testing device is emulating both sides of the over-the-air link, the overall results in the second mode now show test results for the emulated Mobile Client Device with the over-the-air interface removed. The impact of the over-the-air segment upon the broader end-to-end tests may be determined by comparing the mode 2 results with the mode 1 results.

DETAILED DESCRIPTION

Figure 1:
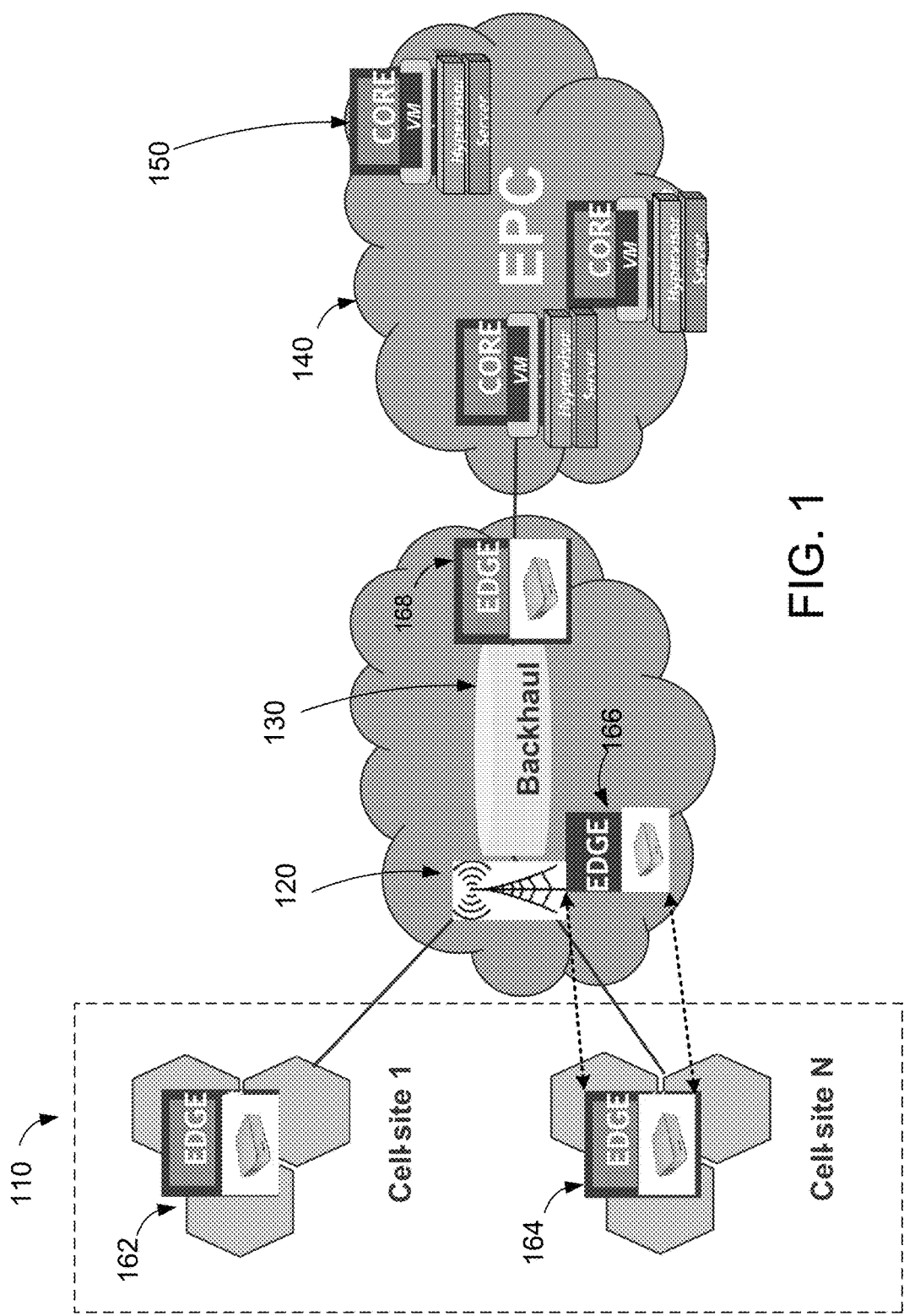
FIG. 1 illustrates an end-to-end live cellular network with test points, according to an implementation of the invention.

The following description of the disclosure will typically be with reference to specific embodiments and methods. It is to be understood that there is no intention to limit the disclosure to the specifically disclosed embodiments and methods, but that the disclosure may be practiced using other features, elements, methods and embodiments. Preferred embodiments are described to illustrate the present disclosure, not to limit its scope. Those of ordinary skill in the art will recognize a variety of equivalent variations on the description that follows. Like elements in various embodiments are commonly referred to with like reference numerals.

Acronyms used in this disclosure are identified the first time that they are used. These acronyms are terms of art, often used in standards documents. Except where the terms are used in a clear and distinctly different sense than they are used in the art, we adopt the meanings found in wireless standards. For the reader's convenience, many of them are listed here:

EPC Evolved Packet Core
ePDG Evolved Packet Data Gateway

E-UTRAN Evolved Universal Terrestrial Radio Access Network
GERAN GMS/Edge Radio Access Network
GGSN Gateway GPRS Support Node
GPRS Global Packet Radio Service
IMS IP Multimedia Subsystem
LTE Long Term Evolution
MME Mobility Management Entity
PGW Packet Data Network Gateway
RAN Radio Access Network
SGSN Serving GPRS Support Node (SGSN
SGW Serving Gateway
UE User Equipment
UMTS Universal Mobile Telecommunications System
UTRAN Universal Terrestrial Radio Access Network
VoLTE Voice Over LTE One of the most important questions to answer when troubleshooting a cellular network is whether the problem is in the over-the-air portion (e.g. too many people accessing the cell) or in the back end network. Separate organizations fix the two different portions (radio team and backend team). However, the over-the-air portion cannot be tested directly in isolation. A testing strategy and devices for isolating the effect of the over-the-air portion of a cellular network for troubleshooting is needed.

FIG. 1 illustrates an end-to-end live cellular network with test points, according to an implementation of the invention. Cell sites 1 through N (110) provide over-the-air data/voice transmissions between a mobile client device (also referred to a handset, a mobile station, a user equipment (UE) in a cellular network or client in a Wi-Fi network) and a network base station 120. The network base station 120 may be a 4G E-UTRAN, a 3G UTRAN, a 2G GERAN, or a Wi-Fi access point. The network base station is the entry point into the wired network. The base station connects the over-the-air network to the backhaul network 130 which delivers network traffic to the evolved packet core (EPC) 140, referred to herein as the core network, that houses the service provider's data center. Although not illustrated in FIG. 1, the core network is connected to the Internet and IP multimedia subsystem (IMS).

FIG. 1 illustrates several points within the end-to-end network where testing devices or software emulators may be installed to run tests for diagnosing network problems. Examples of components where problems can be discovered using this technique include the packet core, IMS, ePDG, Wi-Fi offload gateways, access points, security gateways, and diameter nodes. An edge testing device emulates handsets and base stations. Edge testing devices 162 and 164 operate within a cell site and send test data through the over-the-air network. Edge device 166 is installed close to the back end of the base station 120 and connects to and sends test data through the IP wired network. In an implementation of the invention, a single testing device houses the components for performing tests at test points such as the locations of test devices 164, 162, and 166. Edge device 168 is installed between the backhaul network and the core network. Edge device 168 could alternatively be implemented as software running in a virtual machine. The virtual machine may run in a computing device that performs a function in the network, and may be used opportunistically to run tests in addition to its original function. Alternatively, a computing device may be installed in the network that runs multiple virtual machines, and the tests may run in one of these virtual machines. These edge devices are used to determine which portion of an end-to-end network is experiencing faults or performance problems.

Core testing devices such as 150 are installed within the core network and are used to identify faults caused by components within the data center. Data center components such as the serving gateway (SGW), Packet Data Network Gateway (PGW), and PGW Internet (IP networks) can be tested by inserting a test point immediately downstream of the component and emulating the behavior of the immediately downstream component as though that component had received the data generated by the same test that was run by the edge device in the first mode. Although core testing can be performed using a dedicated testing device running component emulation software, the emulation software may be installed on general purpose processors already installed in the core network.

Figure 2:
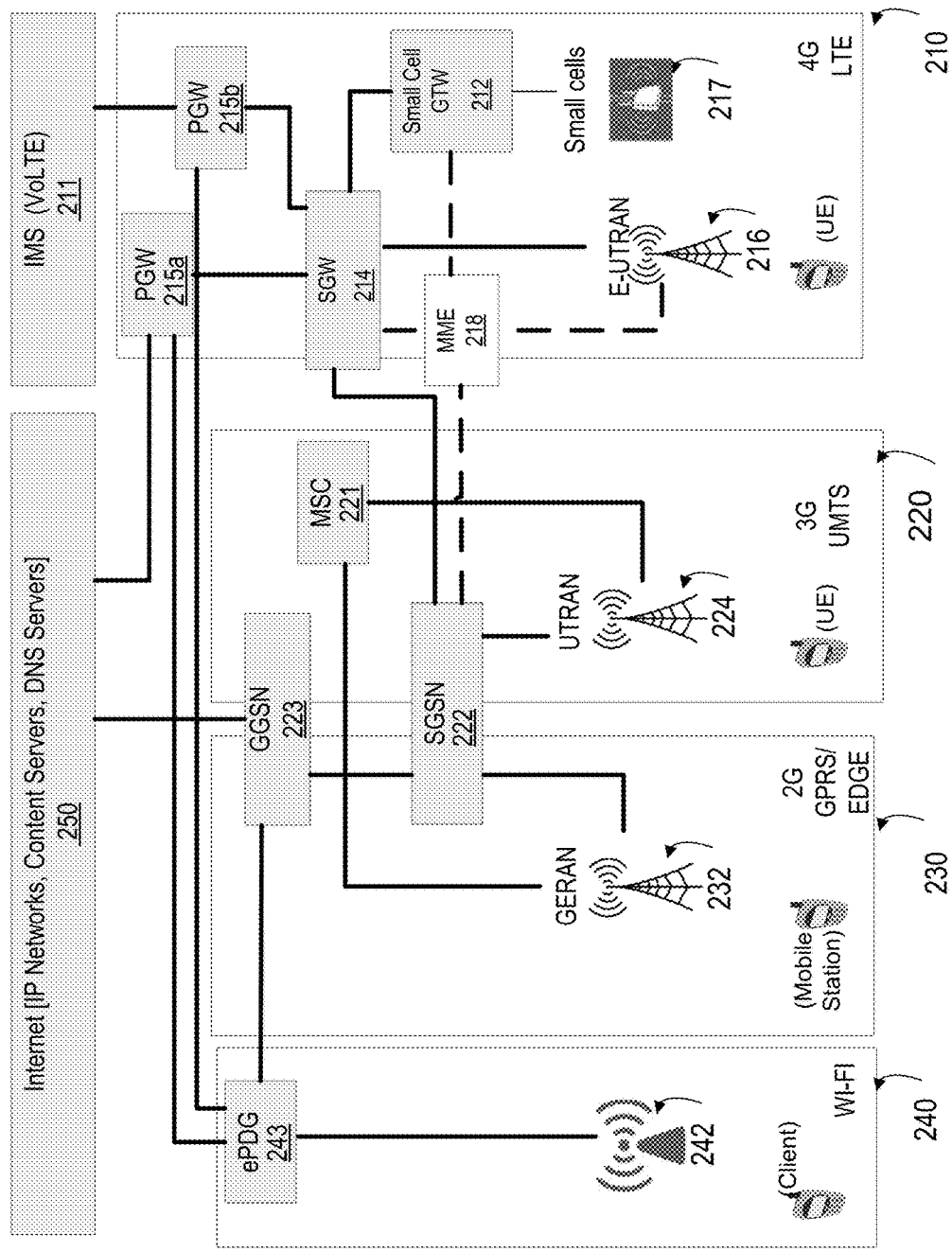
FIG. 2 is a block diagram illustrating a simplified end-to-end wireless network, according to an implementation of the invention.

FIG. 2 is a block diagram illustrating a simplified end-to-end wireless network, according to an embodiment of the invention. The complexity of this diagram illustrates the difficulty of isolating a root cause of a problem that a subscriber might experience when accessing phone-based voice and data services through the provider's network. The solid lines in the diagram indicate a path that voice or data traffic received over the air travels within the core network. The dashed lines in the diagram indicate control communication between core network components. The diagram illustrates four main over-the-air networks: 4G LTE, 3G UTMS, 2G GPRS/EDGE, and Wi-Fi.

Network 210 represents a portion of a 4G LTE network. Base stations labeled E-UTRAN 216 receive the over-the-air signals from 4G UE's and send voice traffic (VoLTE) or data into the LTE network. The 4G UE's may include smart phones, Internet of Things (IOT) devices/meters, and mobile routers.

The LTE over the air network may include multiple small cells 217 to increase capacity of the cellular network to handle more traffic. Small Cell Gateway 212 receives traffic from small cells within the LTE network and directs traffic into the core LTE network.

The E-UTRAN 216 and Small Cell GTW 212 rely on the Mobility Management Entity (MME) 218 to authenticate and authorize the traffic. The MME 218 manages sessions including authenticating the subscriber and generating encryption keys. Thus, the E-UTRAN 216 and the small cell GTW 212 communicate with the MME to perform authentication before allowing traffic to enter into the core network.

Serving gateway (SGW) 214 receives data from a radio network and routes the traffic to one of several PDN Gateways (PGW) depending on the type of traffic. As illustrated, PGW 215a sends traffic to the Internet 250 and PGW 215b routes traffic to the IMS 211. The IMS 211 may provide voice over LTE (VoLTE) services and teleconferencing services, for example. A request for a YouTube download or Facebook interaction may be routed through the Internet 250.

Network 220 represents a portion of a 3G UMTS network. A UTRAN base station 224 receives signals over the air from a 3G UE such as a smart phone or IoT device. Voice traffic is routed to a Mobile Switching Center (MSC) 221 and data traffic is routed to a Serving GPRS Support Node (SGSN) 222. MSC 221 is a gateway into standard worldwide phone network. The SGSN sends the data traffic onto a Gateway GPRS Support Node (GGSN) 223 that, as illustrated, is a gateway into the Internet 250. The connection between SGSN 222 and SGW 214 is used for compatibility of 4G calls with the 3G network. If a 4G call loses coverage, it can be rerouted over the 3G network through the SGSN 222 to the SGW 214 where the traffic may continue to be routed to the Internet 250 via PGW 215*a* or to IMS 211 via PGW 215*b*.

Network 230 represents a portion of a 2G GPRS network. A GERAN base station 232 receives voice traffic from 2G mobile stations (MS) and sends the traffic to the SGSN 222 described for the 3G network.

Network 240 represents a portion of a Wi-Fi network. Access point 242 receives traffic over the air from Wi-Fi Clients. The Wi-Fi traffic is sent to the ePDG 243 which routes the Wi-Fi traffic to a PGW depending on the service requested. Thus, Wi-Fi traffic can be sent to the Internet 250 via PGW 215*a* or to IMS via PGW2*b*. Voice over Wi-Fi (VoWiFi) is routed to the IMS.

FIG. 2 illustrates components in a data center for one service provider. In addition to the complexity with a single provider's end-to-end network, traffic may cross service providers networks. In other words, a Verizon subscriber's traffic may traverse the over-the-air portion of a Sprint network before being routed to a Verizon core network. Thus, a test needs to be able to simulate accessing services by a variety of subscriber configurations.

Figure 3:
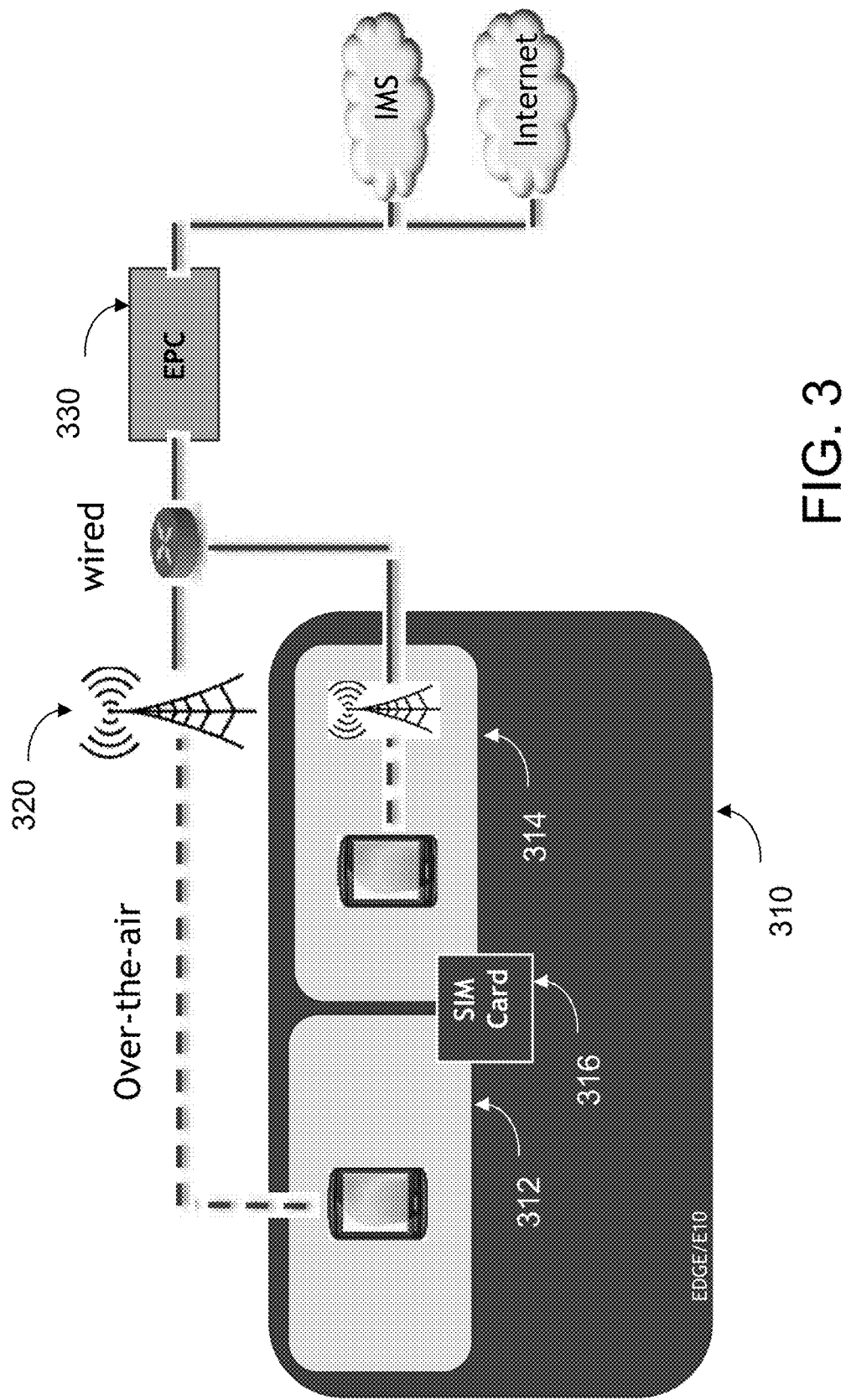
FIG. 3 illustrates a testing device in a cellular network, according to an implementation of the invention.

FIG. 3 illustrates a testing device in a cellular network, according to an implementation of the invention. Edge testing device 310 is inserted into the cellular network at the position 166 in FIG. 1. Edge testing device 310 is a physical device comprising an over-the-air network testing component 312, an IP wired network testing component 314, and a subscriber identification module (SIM) 316. The SIM card 316 includes data that identifies the handset type and the subscriber, such as mobile phone credentials. The SIM contains information about the subscription plan, e.g., prepaid, roaming, etc. and the subscriber's home service provider (such as Sprint or AT&T). The routing of traffic may depend on the combination of the over-the-air network under test and the subscribed provider for the handset, and the provider of the over-the-air network may be different from the subscriber's home service provider. Thus, the data in the SIM may affect the routing and handling of data sent through the network. As a result, the testing device is able to perform a variety of tests that emulates different combinations of handset, subscriber, and end-to-end network characteristics. Table 1 provides a partial list of the variety of tests that require emulation of different combinations.

TABLE 1

Test cases and configurations

| | |
|---|---|
| 1: | Test Prepaid phones, |
| 2: | Test post-paid (normal) phone, |
| 3: | Test roaming phones. |
| 4: | Test In-network phones |
| 5: | Test Mobile Virtual Network Operator (MVNO) customers. |
| 6: | Specific Handset OS characteristics (Android, iOS) like Control plane, data plane, and SIP messaging (VOLTE and VoWIFI) |

In an embodiment, the SIM card 316 may be a physical SIM card installed in the testing device that is accessed by both the handset emulator 312 and the base station emulator 314. The physical SIM card is shared between testing device components that conduct an over-the-air session withe base station and that emulate the base station to the backhaul and core networks. In an embodiment, the testing device may use a virtual SIM card (e.g. e-SIM) instead of a physical SIM card. A virtual SIM card is a protected section of internal memory of the testing device to which the SIM data may be downloaded over a network or stored from another source. The testing device may receive the SIM data through the over-the-air radio channel or over the IP backhaul network. The SIM data includes identifiers which are stored for download in the core network and selected depending on what kind of test is to be performed. The SIM data corresponds to an individual subscriber on a particular service provider's system and stored in the service provider's database. Using a virtual SIM card allows the testing device to assume the identity of different kinds of subscribers based on the SIM data stored in the memory.

Virtual SIM cards are not yet used by most carriers for handsets; however the testing device has characteristics different from a consumer handset which makes it feasible to use a virtual SIM card. The testing device needs to test under a variety of conditions, and the SIM data is used to determine how traffic is handled. It would be cumbersome to have to insert a physical SIM card in order to change the parameters of a testing scenario. A consumer handset is used by a single subscriber. Also, in order to correlate test results from tests run at different points in the end-to-end network, the SIM data used in the tests may be very similar. Although there are certain unique identifiers included in a SIM such as a SIM identifier and a phone number, neither of which can be used simultaneously by multiple calls without triggering fraud detection, all other SIM information including the type of handset and service provider information that affects the behavior of the network may be the same. Thus, more than one testing device that may be physically located far away from each other may need to share most of the same SIM data. It is not typical to have multiple copies of a particular SIM card. A consumer handset can only be in one place at a time.

In an alternative embodiment, running a test may include accessing a remote SIM server such as in the cloud. However, an embodiment that requires the testing device to obtain information from over the network to get the data to be used for running a test uses a physical or pre-configured base SIM with which to establish a network connection.

The over-the-air network testing component 312 comprises a wireless cellular modem and a handset emulator. A variety of handsets and handset behavior may be emulated including Apple and Android phones. Aspects that are emulated include the data plane of the handset, the control plane of the handset, and the cellular protocol such as 2G, 3G, 4G (LTE), VoLTE, and upcoming 5G cellular. The over-the-air network testing component 312 performs a test of the end-to-end network by the emulated handset transmitting voice or data, the transmission including the data in the SIM card 316, through the over-the-air network and recording testing results. The transmitted packets are received by the base station 320 and inserted by the base station into the backhaul network to the core network 330.

The IP wired testing component 314 includes an IP wired interface and base station emulator. The IP wired testing component performs a test of the backhaul network by the emulated handset transmitting voice or data, the transmission including the data in the SIM card 316, through the IP network interface to the backhaul network and test results recorded. The transmission bypasses the physical base station 320, but the packets on the wired network appear to have been generated by a handset and sent over the air. With many if not all aspects of the over-the-air test and the backhaul network test being the same including handset type and SIM data, the difference in the test results may be the affect that the over-the-air portion of the network has on the end-to-end transmission. In that way, the over-the-air portion may be isolated for diagnosis.

For example, a test may comprise placing a telephone call (voice), setting up a video call, downloading a YouTube video to the handset, or accessing Facebook. The test may measure time to set up a connection, jitter, packet loss, or voice/video quality mean opinion score (MOS). Table 2 includes a partial list of tests that may be performed by the testing device.

TABLE 2

Types of tests

| | |
|---|---|
| 1: | Control Plane connectivity |
| 2: | Control Plane attach time |
| 3: | Control Plane failure cause codes (why did this fail?) |
| 3: | Handover/Mobility time |
| 4: | Data plane connectivity |
| 5: | Data plane throughput |
| 6: | Data Plane Loss |
| 7: | Data Plane Jitter |
| 8: | Voice Quality (MOS score) |
| 9: | Video Quality (MOS score) |
| 10: | Response time for websites like youtube, google, etc |

Figure 4:
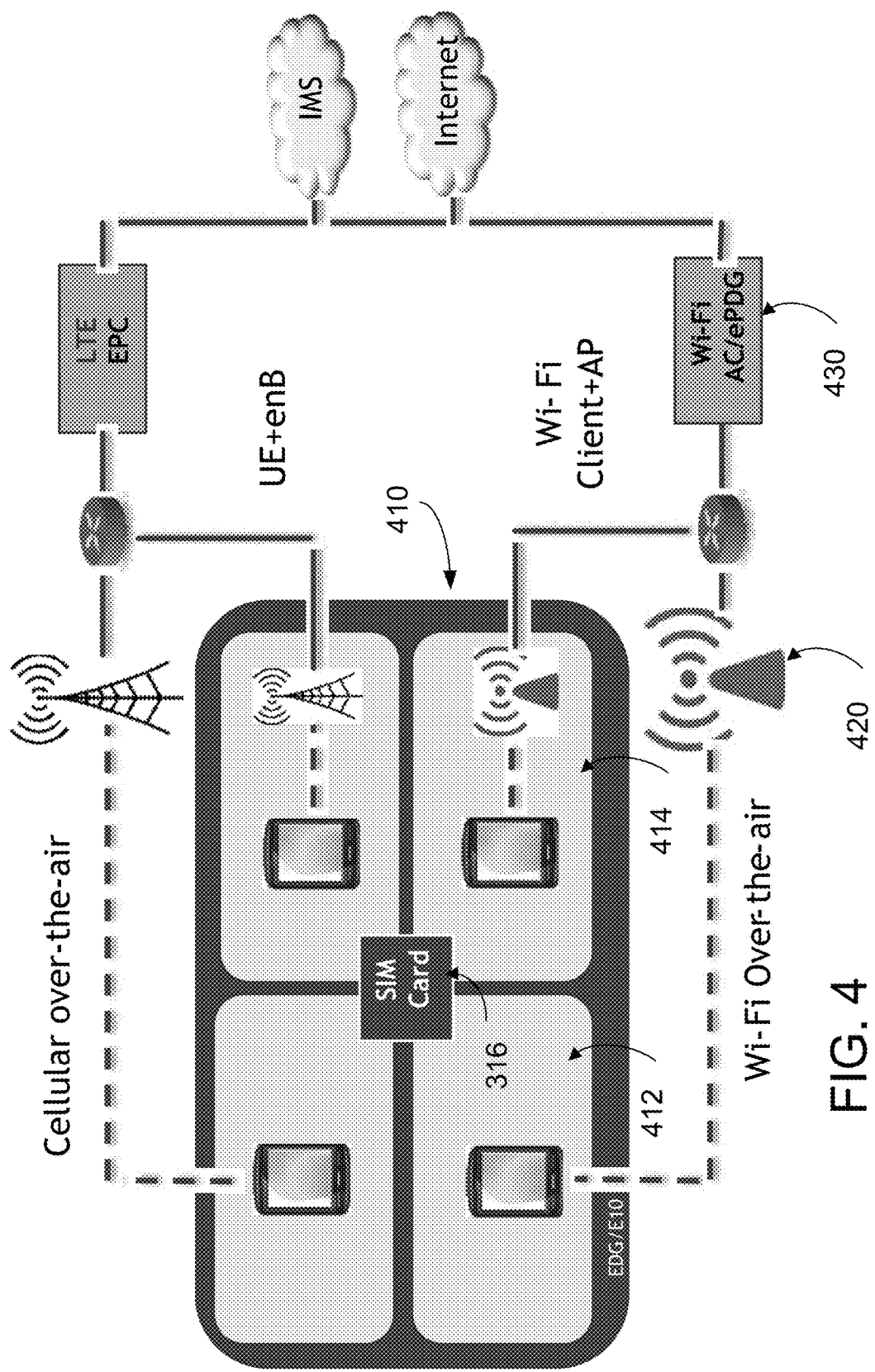
FIG. 4 illustrates testing device for testing both a cellular and a Wi-Fi network, according to an implementation of the invention.

FIG. 4 illustrates testing device that can test both a cellular and a Wi-Fi network, according to an implementation of the invention. Testing device 410 may have the same housing as 310. In addition to emulation components 312 and 314, testing device 410 has additional emulation modules 412 and 414 for testing a Wi-Fi network. The cellular and Wi-Fi tests may use the data from the same SIM 316.

The over-the-air network testing component 412 comprises a Wi-Fi modem and a handset emulator. The handset emulator of 412 performs a test of the end-to-end network by the emulated handset transmitting voice or data, the transmission including the data in the SIM card 316, through the Wi-Fi over-the-air network and recording test results. The transmitted packets are received by the access point 420 and inserted by the access point into the backhaul network to the Wi-Fi core network 430. The IP wired testing component 414 includes an IP wired interface and access controller emulator. The backhaul testing component performs a test of the backhaul network by the emulated handset transmitting voice or data, the transmission including the data in the SIM card 316, through the IP network interface to the backhaul network and test results recorded. The transmission bypasses the physical access point 420, but the packets on the wired network appear to have been generated by a handset and sent over the air.

Figure 5:
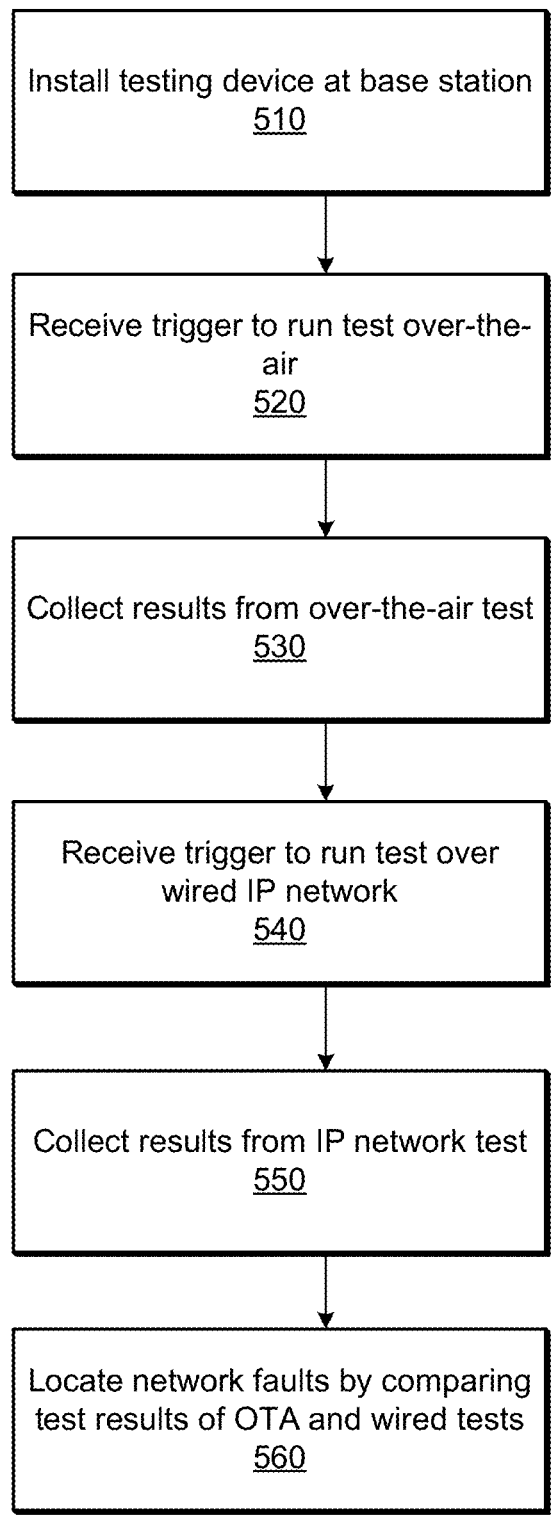
FIG. 5 is a flow diagram illustrating operations to perform network problem diagnosis, according to an implementation of the invention.

FIG. 5 is a flow diagram illustrating operations to perform network problem diagnosis. In Step 510, an edge testing device is installed at the base station of a cellular network. In Step 520, the testing device is triggered to run the over-the-air test. The test may be triggered by a user interacting with a user-input component in the testing device, or the testing device may receive a command from over a network to launch the test. In Step 530, the test results are collected. In Step 540, the testing device is triggered to run the backhaul network test. In Step 550, the test results from the backhaul test are collected. In Step 560, the test results from the over-the-air test and the backhaul network tests are compared, and based on the comparison, a diagnosis is made regarding the portion of the network experiencing a fault or failure. For example, if measurements from the test results in mode 1 are very similar to the measurements from the test results in mode 2, a problem probably exists in the wired network. If the measurements are very different from each other, then there is probably a problem with the over-the-air network. In an embodiment, the test results may be compared by a processor contained within the testing device. In another embodiment, the test results may be sent over the network to a remote device that performs the comparison and determines the diagnosis.

The diagnosis may be provided to the user through a user output component, such as a display, on the testing device, the user output composed within the testing device or by a remote device that sends the diagnosis to the testing device. Alternatively, the diagnosis may be provided to a user by the remote device, such as a network test manager.

Figure 6:
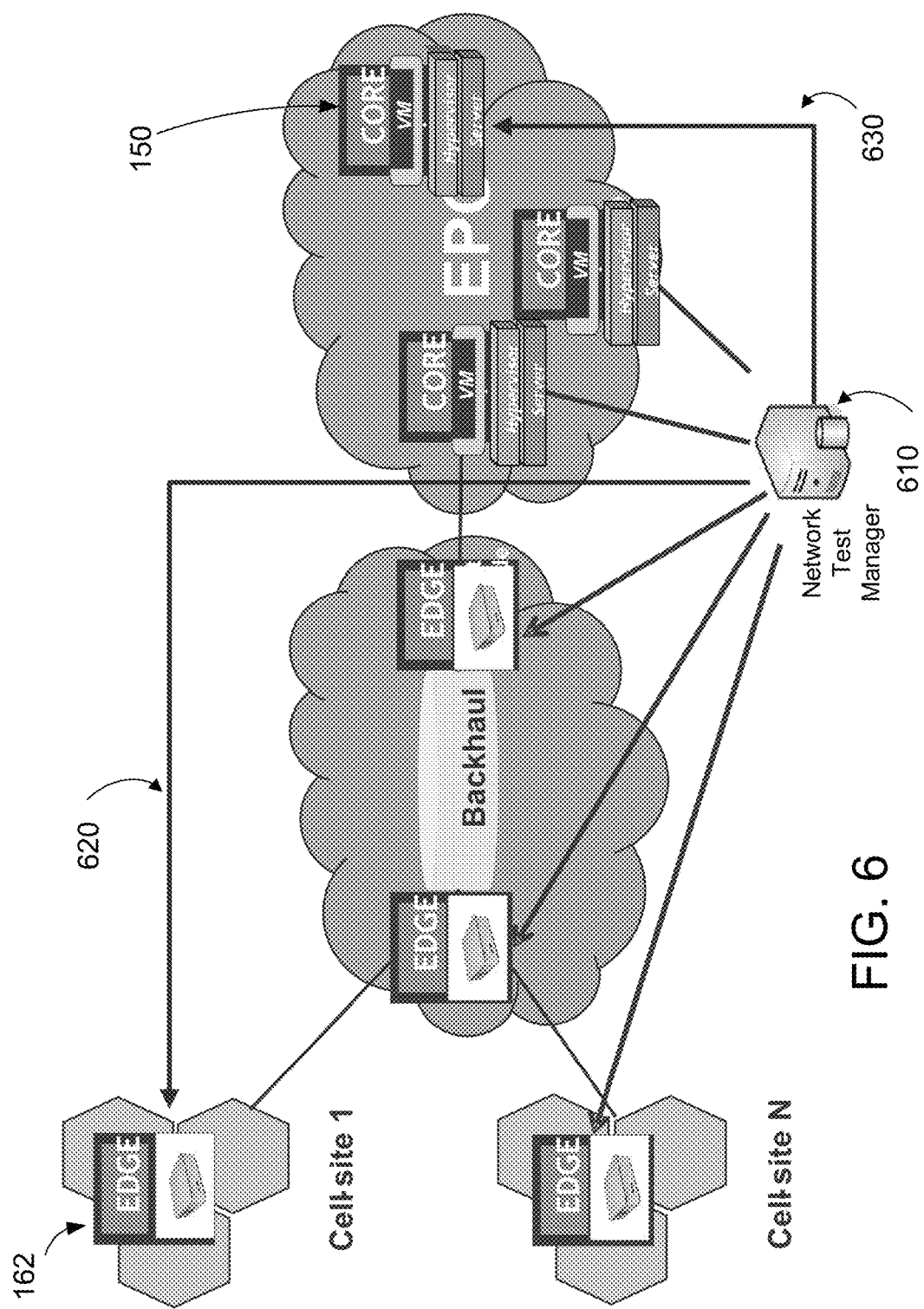
FIG. 6 is a simplified block diagram of a network test manager coordinating testing across a plurality of testing devices, according to an implementation of the invention.

FIG. 6 is a simplified block diagram of a network test manager coordinating testing across a plurality of testing devices, according to an implementation of the invention. Network test manager 610 may be installed anywhere in the network where there is connectivity with each of the edge and core testing devices. For example, connection 620 illustrates a logical connection between the network test manager 610 and the edge testing device 162 in cell site 1, and 630 illustrates a logical connection between network test manager 610 and core testing device 150. The network test manager 610 sends and receives packets to/from the testing devices to trigger the testing devices to launch tests. In an embodiment, the network test manager 610 receives test results and determines a diagnosis based on the set of received test results. In an embodiment, network test manager 610 provides a user display and presents the diagnosis on the display. In another embodiment, network test manager 610 sends the diagnosis to a testing device or other device for display.

The tests launched by the testing devices send data over the data path within the network. The network test manager may communicate with the testing devices over the data path or over the control path. Thus, even when the data path is broken, requiring diagnosis, the control path may provide connectivity among testing devices for exchanging information about the health of the data path.

In an embodiment, the network test manager includes a user input device that allows a user to specify which tests to run at which test points. A user specifying a test to run may cause the network test manager to send a trigger to the specified testing device to launch the specified test. In an embodiment, the user may specify a portion of the network experiencing problems, such as a particular cell site, and the network test manager may automatically determine without human intervention a testing strategy, launch tests according to the strategy, and review and analyze test results. Depending on the test results, the network test manager may determine a diagnosis or, before determining a diagnosis, may revise the testing strategy, trigger more tests, review more test results, and finally provide a diagnosis.

Figure 7:
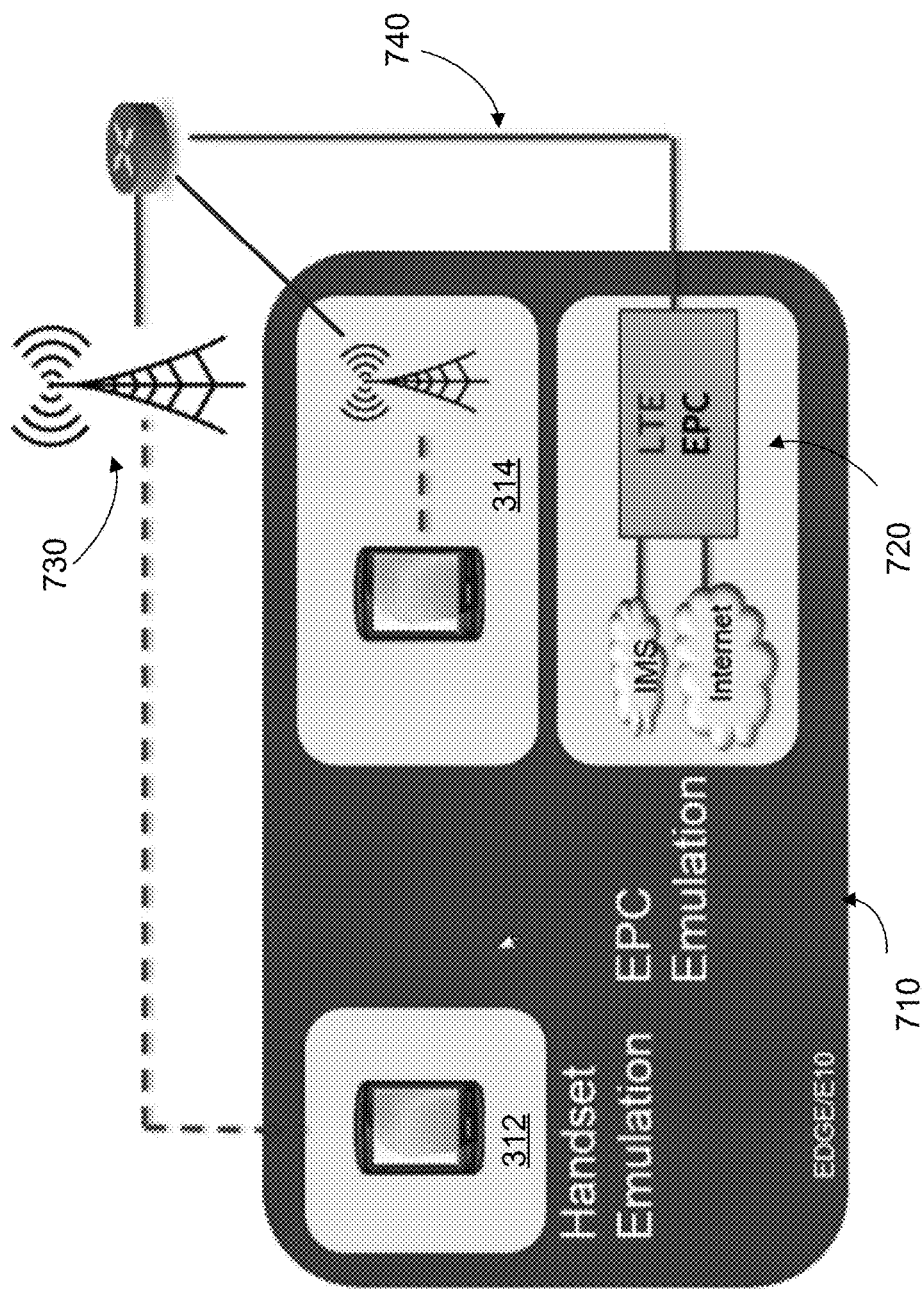
FIG. 7 is a simplified block diagram that illustrates using the testing device to verify the integrity of a small cell network, according to an implementation of the invention.

FIG. 7 is a simplified block diagram that illustrates using the testing device to verify the integrity of a small cell network, according to an implementation of the invention. Similar to edge testing device 310, testing device 710 includes handset emulation 312 and base station emulation 314. However, testing device 710 also includes a core network emulator 720. Testing device 710 allows a small cell to be tested before the small cell is connected to a backhaul network and core network. Handset emulator 312 sends traffic through the small cell base station 730, and the small cell base station forwards the traffic on the wired network 740. The core network emulator 720 is connected to the backhaul network, receives the traffic from the base station 730, and responds. If the test between the handset emulator 312 and the core network emulator 720 fails, then base station emulator 314 may run the test to determine whether the problem causing the test to fail is on the handset or the core network side of the small cell base station.

Examples

Figure 8:
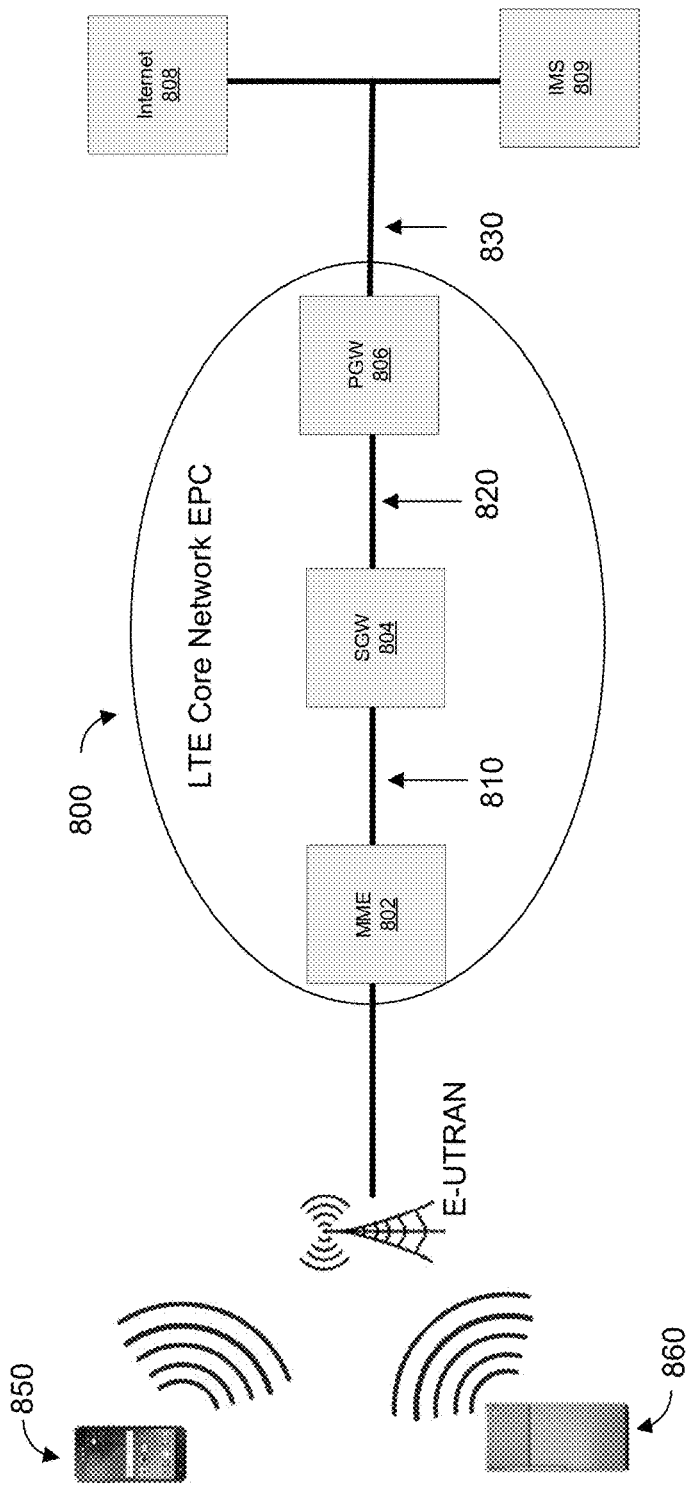
FIG. 8 illustrates components of an LTE network and positions within the network where tests may be run, according to an implementation of the invention.

The testing device may be used with a variety of network technologies, emulating a variety of handset types, and performing different kinds of tests. A first example is diagnosing a smart phone using an LTE network. FIG. 8 illustrates components of an LTE network, including LTE core network EPC 800, and positions within the network where test may be run, according to an implementation of the invention. In this example smart phone 850 places a voice over LTE (voLTE) call over IMS 809, and an internet refrigerator 860 sends a message over the Internet 808. A testing device that emulates traffic coming upstream from the MME 802 may insert data at position 810 of the network Data inserted at position 820 would emulate the output of SGW 804. Data inserted at positions 830 would emulate the output of PGW 806. Thus, a successful test inserted at 820 and a failed test inserted at 810 would indicate a problem with SGW 804.

Figure 9:
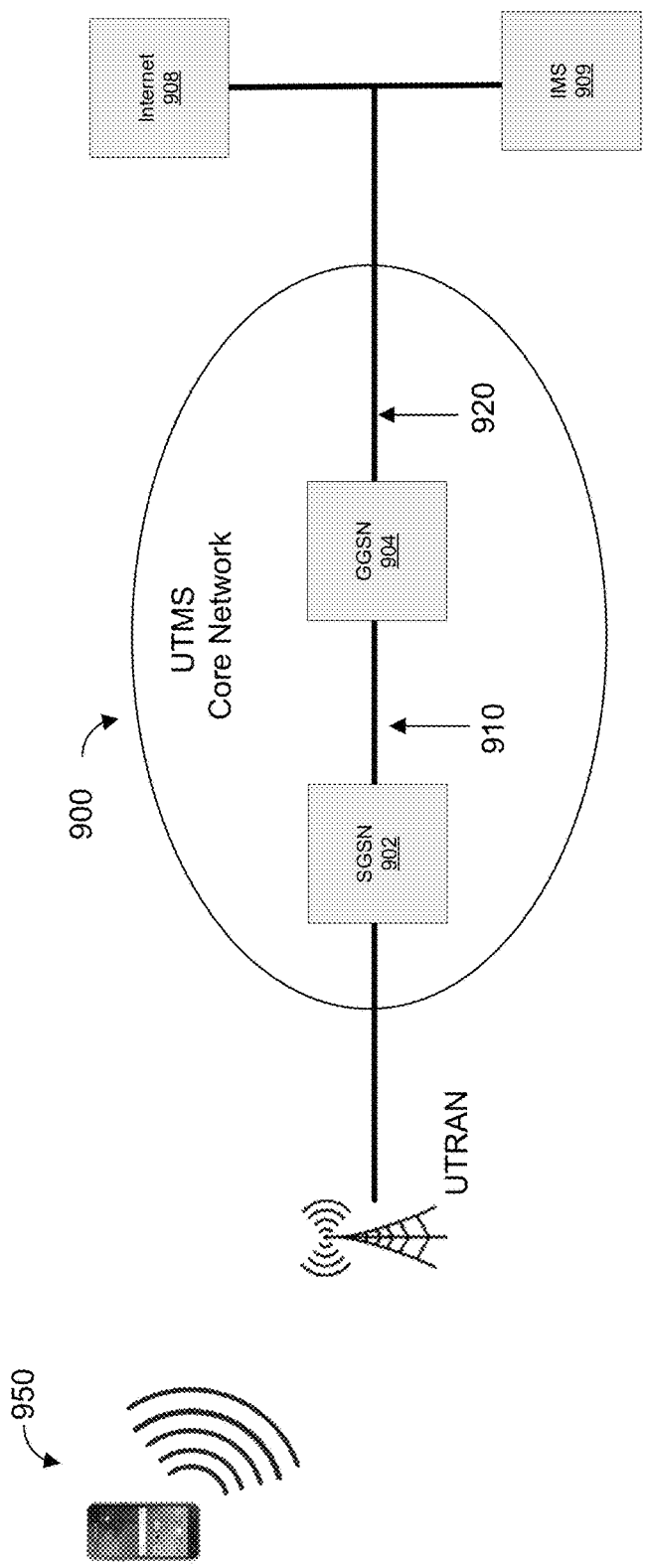
FIG. 9 illustrates an in a 3G network, according to an implementation of the invention.

FIG. 9 illustrates a similar example in a 3G network. Similar to the previous example, smart phone 950 connects to Facebook through the UTMS core network 900 to the Internet 908. A testing device that emulates traffic coming upstream from the SGSN 902 may insert data at position 910 of the network. Data inserted at position 920 would emulate the output of GGSN 904. Thus, a successful test inserted at 920 and a failed test inserted at 910 would indicate a problem with GGSN 904. A failed test initiated from position 920 may indicate a problem with the Internet 908.

Table 1 lists a set of configurations or test cases that can performed using the testing infrastructure and strategy discussed herein.

In addition, Table 2 lists the kinds of test that can be run at the various insertion points of the network and look identical to the destination.

Computer System

Figure 10:
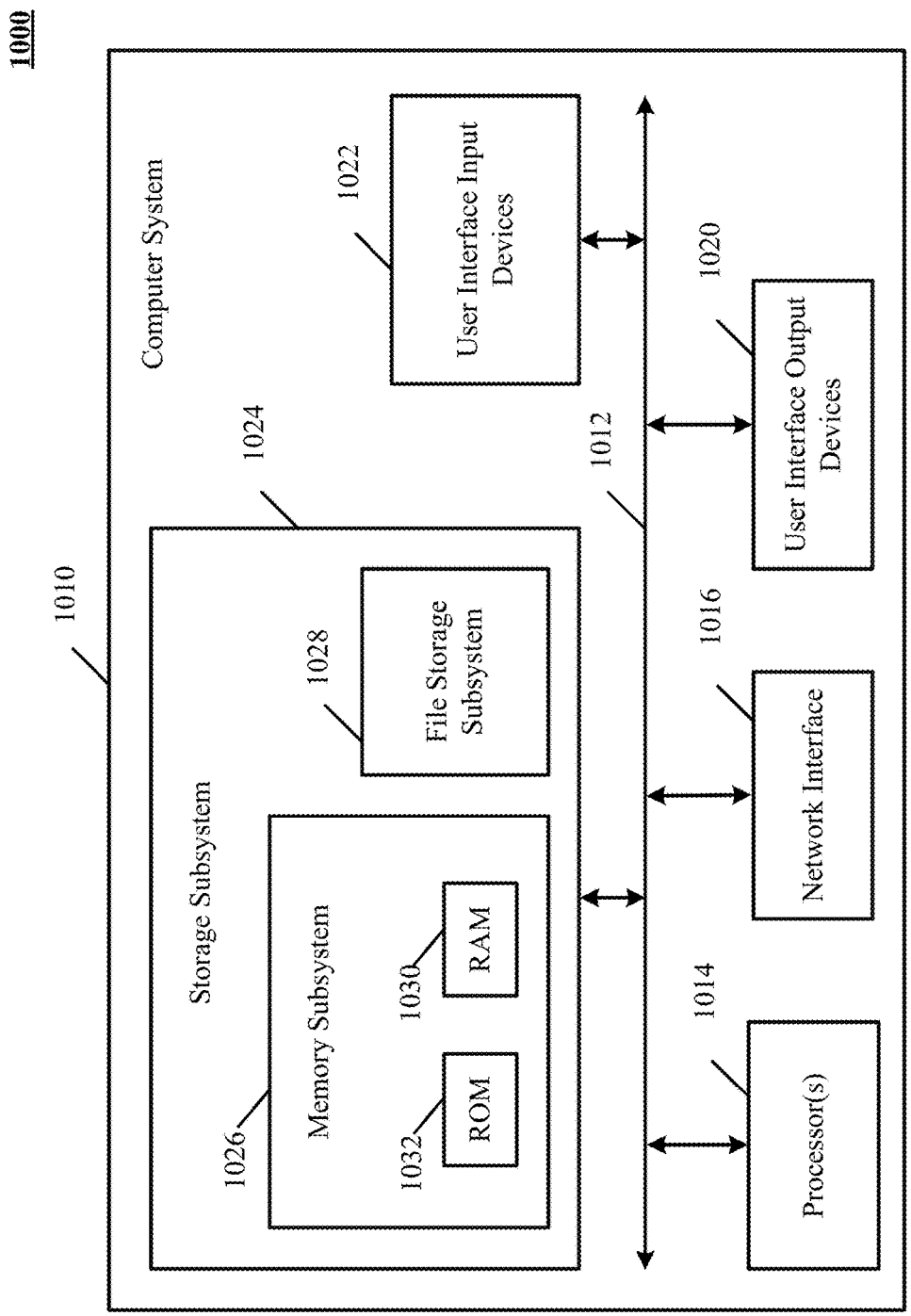
FIG. 10 is a block diagram of an example computer system, according to one implementation.

Edge testing devices, core testing device, and network test manager may be implemented with all or some of the components illustrated in FIG. 10. Each device can be implemented using a computer program stored in system memory, or stored on other memory and distributed as an article of manufacture, separately from the computer system.

FIG. 10 is a block diagram of an example computer system 1000, according to one implementation. Computer system 1010 typically includes at least one processor 1014 that communicates with a number of peripheral devices via bus subsystem 1012. These peripheral devices may include a storage subsystem 1024 including, for example, memory devices and a file storage subsystem, user interface input devices 1022, user interface output devices 1020, and a network interface subsystem 1016. The input and output devices allow user interaction with computer system 1010. Network interface subsystem 1016 provides an interface to outside networks, including an interface to corresponding interface devices in other computer systems.

User interface input devices 1022 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1010.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 1010 to the user or to another machine or computer system.

Storage subsystem 1024 stores programming and data constructs that provide the functionality of some or all of the modules and methods described herein. These software modules are generally executed by processor 1014 alone or in combination with other processors.

Memory 1026 used in the storage subsystem can include a number of memories including a main random access memory (RAM) 1030 for storage of instructions and data during program execution and a read only memory (ROM) 1032 in which fixed instructions are stored. A file storage subsystem 1028 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1028 in the storage subsystem 1024, or in other machines accessible by the processor.

Bus subsystem 1012 provides a mechanism for letting the various components and subsystems of computer system 1010 communicate with each other as intended. Although bus subsystem 1012 is shown schematically as a single bus, alternative implementations of the bus subsystem may use multiple busses.

Computer system 1010 can be of varying types including a workstation, server, computing cluster, blade server, server farm, or any other data processing system or computing device. Due to the ever-changing nature of computers and networks, the description of computer system 1010 depicted in FIG. 10 is intended only as one example. Many other configurations of computer system 1010 are possible having more or fewer components than the computer system depicted in FIG. 10.

In an implementation of core test devices, a computer system hosting a core networking component of the core network may run a core component such as SGW, PGW, MME, etc. in a virtual machine. When a test needs to run within the core network, a new virtual machine may be instantiated on a computer system already running a core component in a virtual machine, and instructions may be downloaded to the computer system from a network test manager to start a new virtual machine and run within the new virtual machine a test that is also downloaded from the network test manager.

Some Particular Implementations

In one implementation, a method for isolating a problem in a live cellular network is provided in which the cellular network includes a network base station that connects an over-the-air network to a backhaul network that connects the network base station to a core network in a data center. The method includes running an over-the-air version and a wired network version of a network test originating from a single mobile test device test using a unitary set of SIM card data in both the over-the-air and wired network session tests. The over-the-air version of the network test uses the test device connected over the air to the network base station, and the wired network version of the network test uses the test device with a wired connection to an IP network and emulates the network base station. The method further includes triggering the testing device to run an over-the-air version and a wired network version of the test, collect the test results of each, and compare the test results to each other to determine whether the problem exists in the over-the-air network or exists within the wired network upstream of the base station.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

In an implementation another testing device is connected between the backhaul network and the core network. If the problem exists within the wired network upstream of the base station, then the other testing device runs a similar test using a similar set of SIM card information as the previous two tests. Test results obtained from running a test from the other testing device are compared with the previous test results to determine whether the problem exists in long haul network or in the core network. Yet another test may be run by inserting test traffic at a point in the core network between core network components to determine whether the problem exists upstream or downstream of the point at which test traffic is inserted in the network.

In another implementation, a testing device is provided to diagnose end-to-end performance problems in a live cellular network. The live cellular network includes a network base station that connects an over-the-air network to a backhaul network that connects the network base station to a core network in a data center. The testing device includes a processor coupled to a memory, a modem that sends data into the over-the-air network, an interface to the backhaul network, and a subscriber identification module (SIM) that stores identification data for a particular endpoint device. The testing device connects to the backhaul network positioned near the network base station. The testing device memory stores instructions that are executed by the processor. Several sets of instructions are stored and executed including emulating the network base station, launching a test that sends data through the modem into the over the air network, launching a similar test that sends data produced by the base station emulator over the backhaul network. The test launched over the air and the test launched over the backhaul network both include data from the same SIM. In an implementation, the testing device may receive a trigger that causes the device to launch the tests, collect the test results, and display test results determined by comparing first test results against second test results. The testing device may also include a user input device that receives user input and in turn trigger the launching of tests and analysis and display of test results. The testing device may also include a display device that displays the test results. The test device may further store and execute instructions for comparing test results and determining a diagnosis.

In another implementation, the testing device may receive over the network from a network test manager a trigger to launch the over-the-air and backhaul network tests. The network device may send test results to the network test manager and receive back from the network test manager a diagnosis of the performance problem based on the test results.

The SIM card in the testing device may be a physical card on which identification data is stored; or the SIM card may be implemented as a virtual SIM card including software that stores identification information provided by a remote source.

The testing device may emulate an Android OS handset or an Apple iOS handset.

In another implementation a system is provided for isolating a problem in a live cellular network. The system includes a plurality of testing devices and a network test manager. The network test manager includes an interface for connecting to the backhaul network, a user input device, user output device, and a processor for executing instructions stored in a memory. The network test manager may receive a command from a user through the user input device to run a test for diagnosing the problem. The network test manager may send a message to trigger a testing device to launch a test. The network test manager may also send a message to a different testing device attached to the network at a different location to launch a test. The network test manager may also receive test results back from the test device it triggered, and determine which portion of the network is experiencing a problem based on comparing the received test results. The indication of the portion of the network experiencing a problem may be displayed on the user output device In another implementation, the testing device may be used for verifying the integrity of a small cell wireless network that includes a base station or access point for sending data to a core network. The testing device described above further includes a core network emulator. This small cell wireless network testing device may send data into the small cell wireless network through the wireless modem. The base station or access point installed in the small cell wireless network may relay the data received over the wireless network to the core network emulator in the testing device. The core network emulator may send response data to the handset emulator through the small cell wireless network. The base station or the access point may send the first data to the core network emulator through the backhaul network when it becomes available. The response data may provide an indication of network functioning that may be provided to a user.

The small cell wireless network testing device may include a cellular modem and the small cell wireless network may include a base station. Alternatively, the testing device may include a Wi-Fi modem and the small cell wireless network may include a Wi-Fi access point. In an implementation, the small cell network includes both a cellular base station and a Wi-Fi access point, and the testing device may include a cellular modem in addition to a Wi-Fi modem. Either modem may be used to send data to the core network emulator. In an implementation, the backhaul network may relay the data received by the base station or access point to the core network emulator.

We claim as follows:

1. A method for isolating a problem in a live cellular network that includes a network base station that connects an over-the-air network to a backhaul network that connects the network base station to a core network in a data center, the method comprising:

running an over-the-air version and a wired network version of a network test originating from a single mobile test device test using a unitary set of SIM card data in both the over-the-air and wired network session tests, wherein the over-the-air version of the network test uses the test device connected over the air to the network base station, and the wired network version of the network test uses the test device with a wired connection to an IP network and emulates the network base station;

triggering the testing device to run a first test, launching as the first test the over-the-air version of the network test, and collecting first test results;

triggering the testing device to run a second test, launching as the second test the wired network version of the network test that comprises emulating the network base station, and collecting second test results;

comparing the first and second test results to determine whether the problem exists in the over-the-air network or exists within the wired network upstream of the base station.

2. The method of claim 1, further comprising:

connecting a second testing device between the backhaul network and the core network;

responsive to determining that the problem exists within the wired network upstream of the base station, triggering the second testing device to run a third test and collect third test results;

comparing the second test results to the third test results to determine whether the problem exists in long haul network or in the core network.

3. The method of claim 2, further comprising:

connecting a third testing device between components within the core network;

responsive to determining that the problem exists within the core network, triggering the third testing device to run a fourth test and collect fourth test results;

comparing the third test results to the fourth test results to determine whether the problem exists upstream or downstream of the third testing device.

4. A testing device for diagnosing an end-to-end performance problem in a live cellular network that includes a network base station that connects an over-the-air network to a backhaul network that connects the network base station to a core network in a data center, the testing device comprising:

a processor coupled to a memory;

a modem operable to send data into the over-the-air network, an interface to the backhaul network, and a subscriber identification module (SIM) storing identification data for a particular endpoint device;

the testing device connected by the interface to the backhaul network, the connection positioned near the network base station;

the memory storing a plurality of sets of instructions, wherein:

a first set of instructions which when executed by the processor causes the processor to emulate the network base station, a second set of instructions which when executed by the processor causes the processor to launch a first test that sends data through the modem into the over the air network, and a third set of instructions which when executed by the processor causes the processor to launch a second test that sends data that emulates the network base station to send data over the backhaul network;

wherein the data sent by the first test and the second test both include a unitary set of data stored in the SIM.

5. The testing device of claim 4, wherein the testing device is operable to:

receive a trigger to run the first test, launch the first test, and collect first test results;

receive a trigger to run the second test, launch the second test, and collect second test results; and display test results determined by comparing first test results against second test results.

6. The testing device of claim 4, further comprising a user input device, the user input device operable to receive user input and trigger the first and second tests to launch.

7. The testing device of claim 4, further comprising a display device, the display device operable to display a diagnosis of the performance problem determined based on comparing first test results with second test results.

8. The testing device of claim 7, wherein the memory stores a fourth set of instructions which when executed by the processor causes the processor to compare the first test results with the second test results and determine a diagnosis.

9. The testing device of claim 4, wherein the testing device is communicatively coupled to a network test manager and operable to receive a trigger from a network test manager to launch the first or second test.

10. The testing device of claim 4, wherein the testing device is communicatively coupled to a network test manager and operable to:

send first and second test results to the network test manager; and receive from the network test manager a diagnosis of the performance problem based on the first and second test results.

11. The testing device of claim 4, wherein the SIM is one of:

a physical card inserted into the testing device on which identification data is stored; or a virtual SIM card comprising software that receives identification information from a remote source and stores the information in the memory on the testing device.

12. The testing device of claim 4, wherein launching the first test and the second test cause the testing device to emulate one of an Android OS handset and an Apple iOS handset.

13. A system for isolating a problem in a live cellular network, the system comprising:

a plurality of testing devices as claimed in claim 4;

a network test manager comprising:

a processor coupled to a memory;

an interface to the backhaul network;

a user input device; and a user output device;

the network test manager communicatively coupled to the one or more testing devices and operable to:

receive a command from a user through the user input device to run a test for diagnosing the problem;

send a message to a first testing device of the plurality of testing devices to trigger launching a first test;

send a message to a second testing device of the plurality of testing devices to trigger launching a second test, wherein the first testing device and the second testing device are connected to the network at different locations;

receive first test results from the first testing device and second test results from the second testing device;

determine a portion of the network experiencing a problem based on comparing the first test results with the second test results; and display on the user output device an indication of the portion of the network experiencing a problem.

14. A testing device for verifying integrity of a small cell wireless network that includes a base station or access point for sending data to a core network, the testing device comprising:

a processor coupled to a memory;
a wireless modem;
a backhaul network interface;
a subscriber identification module (SIM) storing identification data for a particular endpoint device;
a handset emulator; and
a core network emulator;
wherein the testing device is operable to:
send first data from the handset emulator into the small cell wireless network through the wireless modem to the core network emulator, wherein the first data includes handset and subscriber identification data stored in the SIM;
wherein a base station or access point installed in the small cell wireless network relays the first data received over the wireless network to the core network emulator, and in response to receiving the first data, the core network emulator sends response data to the handset emulator through the small cell wireless network;
receive the response data; and
display an indication of network functioning based on the response data.

15. The testing device of claim 14, wherein the wireless modem is a cellular modem and the small cell wireless network includes a base station.

16. The testing device of claim 14, wherein the wireless modem is a Wi-Fi modem and the small cell wireless network includes a Wi-Fi access point.

17. The testing device of claim 14, further comprising a second wireless modem, wherein:

the small cell wireless network comprises both a cellular network and a Wi-Fi network and comprising a corresponding base station and access point respectively;
the wireless modem is a cellular modem and the second wireless modem is a Wi-Fi modem; and
the testing device is operable to send data to the core network emulator through one of the Wi-Fi modem and the cellular modem.

18. The testing device of claim 14, wherein:
the base station or the access point sends the first data to the core network emulator through the backhaul network.

* * * * *